US008561208B2

(12) United States Patent  (10) Patent No.: US 8,561,208 B2
Corbett et al.  (45) Date of Patent: Oct. 15, 2013

(54) SECURE USER INTERFACE CONTENT

(75) Inventors: Jim D. Corbett, Berkeley, CA (US); Oliver Goldman, Los Altos, CA (US); Rajesh K. Gwalani, Sunnyvale, CA (US); Robert O. Kwon, San Francisco, CA (US); John Joseph Moyer, Palo Alto, CA (US); Michael Brian Orr, Indianola, WA (US); Peleus Uhley, Alameda, CA (US)

(73) Assignee: Adobe Systems Incorporated, San Jose, CA (US)

( * ) Notice: Subject to any disclaimer, the term of this patent is extended or adjusted under 35 U.S.C. 154(b) by 112 days.

(21) Appl. No.: 13/212,996

(22) Filed: Aug. 18, 2011

(65) Prior Publication Data

US 2013/0167243 A1    Jun. 27, 2013

Related U.S. Application Data

(60) Provisional application No. 61/488,687, filed on May 20, 2011.

(51) Int. Cl.
*G06F 21/20* (2006.01)
*G06F 21/22* (2006.01)

(52) U.S. Cl.
USPC ............... 726/27; 726/26; 726/28; 726/29; 726/30; 713/189; 713/193

(58) Field of Classification Search
USPC ............................ 713/189, 193; 726/26–30
See application file for complete search history.

(56) References Cited

U.S. PATENT DOCUMENTS

| 2007/0028111 | A1 | 2/2007 | Covely |
| 2008/0155034 | A1 | 6/2008 | Chen et al. |
| 2010/0031022 | A1* | 2/2010 | Kramer ......................... 713/155 |
| 2011/0296529 | A1* | 12/2011 | Bhanoo et al. .................. 726/26 |

OTHER PUBLICATIONS

Unknown Author, "HTTPS," definition of HTTPS in the Free Online Encyclopedia, downloaded from the Internet at: http://encyclopedia2.thefreedictionary.com/HTTPS, on May 13, 2011, 2 pages.
Unknown Author, "SiteKey," definition of SiteKey in the Wikipedia, downloaded from the Internet at: http://en.wikipedia.org/wiki/SiteKey, on May 13, 2011, 2 pages.
Unknown Author, "SSL," definition of SSL in the Free Online Encyclopedia, downloaded from the Internet at: http://encyclopedia2.thefreedictionary.com/SSL, 3 pages.

(Continued)

*Primary Examiner* — Beemnet Dada
*Assistant Examiner* — Kalish Bell
(74) *Attorney, Agent, or Firm* — Wolfe-SBMC (57) ABSTRACT

Methods, systems, and apparatus, including computer programs encoded on a computer storage medium, for handling secure user interface content. In one aspect, a method includes receiving, at a data processing apparatus, content over a communication network from a computing system separate from the data processing apparatus; determining that the received content is authentic secure content; retrieving information stored at the data processing apparatus and previously selected by a user for purposes of securing user interface content; rendering the received content, to a display of the data processing apparatus, as a user interface with a visual wrapper, where the visual wrapper includes the retrieved information, visually separates the user interface from other visual elements on the display, and includes an indication that the user interface is secure; and processing input received through the user interface.

20 Claims, 4 Drawing Sheets

(56) References Cited

OTHER PUBLICATIONS

Youll, Jim, "Fraud Vulnerabilities in SiteKey Security at Bank of America," Jul. 18, 2006, Review draft to Bank of America/RSA, 15 pages.

Cannella et al., "Secure Visualization of Authentication Information: A Case Study," 2004, Proceedings of the IEEE Symposium on Visual Languages and Human Centric Computing, 3 pages.

Ross et al., "Stronger Password Authentication Using Browser Extensions," 2005, 14th USENIX Security Symposium, 15 pages.

Smetters et al., "Breaking out of the Browser to Defend Against Phishing Attacks," 2008, downloaded from the Internet at: http://www.ceas.cc/2008/papers/ceas2008-paper-58.pdf, 10 pages.

* cited by examiner

SECURE USER INTERFACE CONTENT

CROSS REFERENCE TO RELATED APPLICATIONS

This application claims the benefit of priority from U.S. Provisional Application entitled "SECURE USER INTERFACE CONTENT", filed May 20, 2011, and assigned Application Ser. No. 61/488,687.

BACKGROUND

This specification relates to securing user interfaces used with communications over computer networks.

A client-server environment is a network architecture in which clients generally rely on servers for resources, such as files, databases, devices, processing power, etc. The World Wide Web and its associated web servers and web browsers are a typical example of a client-server environment using an existing underlying computer network (e.g., the Internet) for communications. The World Wide Web currently provides users worldwide with access to many products, services and information. Access to such products, services and information is sometimes restricted, such that a user must pay to gain access (e.g., enter credit card information), login (e.g., enter a user name and password), or both.

In order to secure the communications involved in such payment or login activity, many current web browsers include support for HyperText Transport Protocol Secure (HTTPS). HTTPS is a protocol used to access a secure web page provided by a secure web server. In addition, browsers that support HTTPS typically also show a lock icon within the confines of the browser's own user interface to show that some content rendered within the browser window has been delivered securely. Thus, by looking for the lock icon, any Universal Resource Locator (URL) displayed by the browser, and potentially additional information derived from the secure web server's certificate, a user can determine whether or not to trust the currently displayed page with sensitive information to be entered.

In other cases, web sites have used SWF content to create user interfaces that capture sensitive data from users. Note that SWF is a file format, such as the SWF File Format Specification (Version 10) as published by Adobe Systems Incorporated of San Jose, Calif. The SWF file format delivers vector graphics, text, video, and sound over the Internet and is supported by Adobe® AIR™ software and Adobe® Flash® Player software, at least the latter of which has used modal windows, anti-overlay protection, bitwise comparison, cross-cite scripting and display list protections, in order to secure traditional user interfaces.

SUMMARY

This specification describes technologies relating to securing user interfaces used with communications over computer networks, and in particular, to secure user interface content.

In general, one innovative aspect of the subject matter described in this specification can be embodied in methods that include the actions of receiving, at a data processing apparatus, content over a communication network from a computing system separate from the data processing apparatus; determining that the received content is authentic secure content; retrieving information stored at the data processing apparatus and previously selected by a user for purposes of securing user interface content; rendering the received content, to a display of the data processing apparatus, as a user interface with a visual wrapper, where the visual wrapper includes the retrieved information, visually separates the user interface from other visual elements on the display, and includes an indication that the user interface is secure; and processing input received through the user interface. Other embodiments of this aspect include corresponding systems, apparatus, and computer programs, configured to perform the actions of the methods, encoded on computer storage devices.

These and other embodiments can each optionally include one or more of the following features. The methods can further include receiving input from a user to specify the information to store locally. The visual wrapper can be a border, which fully surrounds the user interface to visually separate the user interface from any other visual elements on the display. Retrieving the information can include retrieving an image and a passphrase.

The determining can include confirming a digital signature associated with the content, and confirming the content was received from a predefined secure domain in the communication network. In addition, the receiving, the determining, the retrieving, the rendering and the processing can be performed by a programmatic execution environment running on the data processing apparatus, and the operations can include loading the content into a sandbox managed by the programmatic execution environment, where the sandbox is distinct from at least two other sandboxes managed by the programmatic execution environment, and wherein the sandbox prevents loading of additional content by the received content, unless the additional content is determined to be authentic secure content as done for the received content.

The received content can include bytecode, and the rendering can include rendering additional bytecode retained by the programmatic execution environment to form the visual wrapper or on-screen border. The receiving can include receiving the content over a secure channel established in the communication network, the rendering can include rendering in a modal window, preventing interactions with the data processing apparatus outside of the modal window until the modal window is closed. In addition, the methods can include: preventing bytecode other than the content bytecode and the additional bytecode from being placed on top of the user interface and the on-screen border on the display; comparing an output provided to the display during the rendering with an input retrieved from the display; preventing calls into the content bytecode in the sandbox that are not approved by the content bytecode; and preventing access to, and movement of, a node in a display list managed by the programmatic execution environment, the node corresponding to the content bytecode.

Another innovative aspect of the subject matter described in this specification can be embodied in systems that include: a display device; and a computing device coupled with the display device and programmed to perform operations including: receiving, at the computing device, content over a communication network from a computing system, the computing system being separate from the computing device; determining that the received content is authentic secure content; retrieving information stored at the computing device and previously selected by a user for purposes of securing user interface content; rendering the received content, to the display device, as a user interface with a visual wrapper, where the visual wrapper includes the retrieved information and visually separates the user interface from other visual elements on the display; and processing input received through the user interface.

Particular embodiments of the subject matter described in this specification can be implemented so as to realize one or more of the following advantages. A user can be given a better sense of whether or not to trust a particular user interface (provided by a remote server) with their sensitive information (e.g., credit card information or user name and password). This can be done with many different types of content and need not require the use of a secure web page for delivery of, and interaction with, the user interface. This can result in less friction for sensitive transactions (e.g., entry of credit card information or user name and password) since redirection to a secure web page is not needed, which can result in a significant drop-off in transaction completion rates. Moreover, in some cases, use of fully secured web pages is impractical because the user interface content (e.g., online games) are frequently published to a variety of pages that may not otherwise need to be secured.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
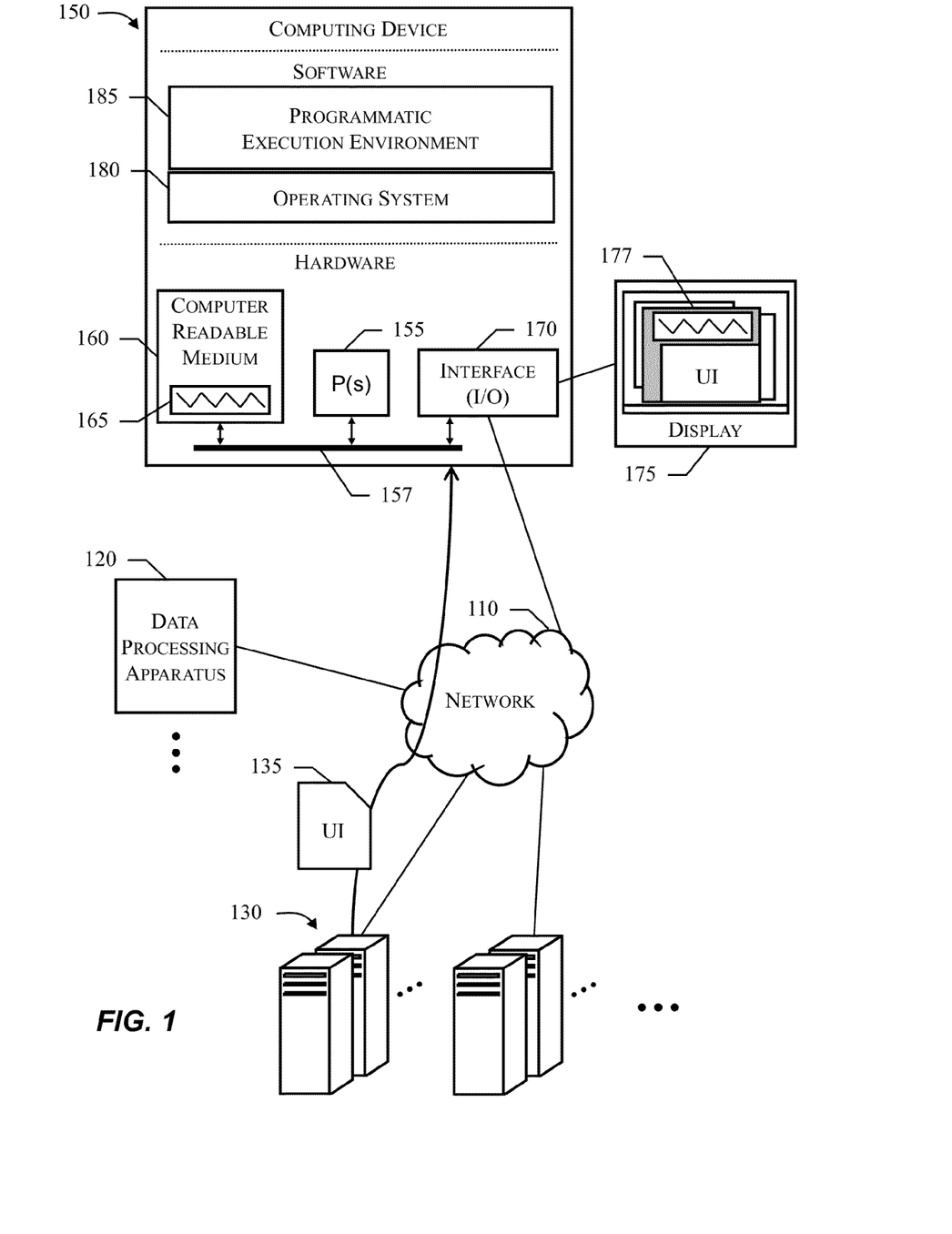
FIG. 1 is a block diagram showing an example of a system in which secure user interface content is presented.

FIG. 1 is a block diagram showing an example of a system in which secure user interface content is presented. A communication network 110 provides a mechanism by which multiple different computing systems can communicate with each other. The network 110 can include local area networks (e.g., an Ethernet network), wide area networks (e.g., a campus or city computer network), public or private networks (e.g., an enterprise network), wired or wireless networks (e.g., a mobile phone network), inter-networks (e.g., the Internet), virtual private networks (VPNs), or a combination of these.

One or more data processing apparatus 120 are communicatively coupled with the network 110. These data processing apparatus 120 can include various types of computers and computing devices, such as desktop computers, laptops, tablet computers, smart phones, etc. Moreover, in some implementations, these data processing apparatus 120 can include entirely different computing platforms, with different hardware, instruction set architectures, and operating systems.

As a further detailed example, a data processing apparatus 120 can include a computing device 150, which includes hardware and software. The hardware includes an interface 170, a processing device 155, a computer-readable medium 160, and a system bus 157 to connect them, all of which can, in some implementations be integrated on a single circuit board. The system bus 157 can include multiple different types of busses, such as parallel or serial busses. The computer-readable medium 160 can include one or more non-volatile memories and storage devices (e.g., flash memory and a hard disk), one or more volatile memory devices (e.g., dynamic or static random access memory), or a combination of these.

The processing device 155 can include one or more microprocessors and/or multicore processors. The interface 170 can include different types of interface circuitry and devices, such as a network card, or a radio frequency (RF) section and antenna, to connect to the network 110. The interface 170 can also include other types of interface devices such as input/output (I/O) devices used to connect with other components, such as a keyboard, a cursor moving device, speaker(s), a microphone, a digital camera, and a display device 175. Note that one or more or all of these other components can be integrated with the computing device 150 (e.g., in the case of a smart phone, the display 175 and the computing device 150 are integrated into a single consumer electronic device). Likewise, one or more or all of these other components can be kept separate from the computing device 150 (e.g., in the case of a desktop computer, the display 175 and the computing device 150 are separately sold consumer electronic devices).

Computing systems 130 are also communicatively coupled with the network 110 and include hardware and software. While such computing systems 130 are separate from the data processing apparatus 120 and the computing device 150, their hardware can include hardware similar to one or more of the hardware devices described above for the computing device 150, and at a minimum includes at least one processor, at least one memory device, and at least a network interface, for each computing system 130. In some implementations, a computing system 130 includes multiple server computers including multiple processors and memory devices. For example, a computing system 130 can include a server cluster or server farm, where the server computers can be located in the same general location (e.g., a specific building) or can be distributed across a wide area (e.g., across the United States and connected by the Internet).

A computing system 130 provides content 135 that defines a user interface. The content includes some form of instructions that can be interpreted, executed or both, at the receiving computing device 150, to create a user interface (UI) on a screen of the display device 175. For example, the content 135 can be rendered to the screen to effect an online payment user interface or a login user interface on the receiving data processing apparatus.

The content 135 can include different types of encoded instructions and data. The content 135 can be well-defined virtual instructions or bytecode, which is interpretable by a programmatic execution environment 185 that runs on top of an operating system (OS) 180 at the computing device 150. The content 135 can be content that runs inside a web browser program, or other program or the operating system 180, on the computing device 150, and such software can provide an application program interface (API) that allows various other programs to load, display and unload the content 135.

Moreover, in some implementations, the content 135 can be programmatically isolated (as described in further detail below) and can selectively expose an API to content that loaded the content 135. This can facilitate communication with the user and brokering of transactions between the user and the content that loaded the content 135. Thus, in some implementations, the content 135 can permit script-bridging with its parent, yet exert control over the amount of bridging permitted. In addition, the content 135 can load additional content, as desired, or in some implementations, the content 135 can be limited to loading only other content secured in a manner similar to content 135 (e.g., secure content loaded with a digital signature check and source domain check, but rendered without another visual wrapper since the visual wrapper for content 135 should be sufficient).

The programmatic execution environment 185 provides the content 135 (and other code) with access to functions provided by the operating system 180. The programmatic execution environment 185 can be a cross-OS runtime environment that runs platform-independent bytecode. For example, the content 135 can be SWF content, and the programmatic execution environment 185 can be the Adobe® Integrated Runtime (AIR™) environment, or the Adobe® Flash® Player runtime environment, both provided by Adobe Systems Incorporated of San Jose, CA. As another example, the content 135 can be sandboxed native code. Moreover, the programmatic execution environment 185 can be a plug-in software component to another program, such as a web browser program.

When the computing device 150 receives the content, it can determine whether the received content is authentic secure content, and then retrieve information 165 stored at the data processing apparatus. This locally stored information 165 is local in the sense that it is accessible without going through the network 110, is preferably stored in some form of local non-volatile memory or storage device (e.g., a flash memory or a hard disk) and may also be protected from access by software other than the programmatic execution environment 185 or the operating system 180. Moreover, the information 165 was previously selected by a user of the computing device 150 for purposes of securing user interface content.

Thus, once the information 165 is retrieved, the computing device renders the content 135 to the display device 175 as a user interface with a visual wrapper 177, where the visual wrapper 177 includes the retrieved information 165 and visually separates the user interface from other visual elements on the display, such as shown in FIG. 1. By presenting the information 165 along with the visual wrapper 177 for the user interface, this provides the user with a level of confidence that the user interface is secure for entry of sensitive information, since it would be difficult (if not impossible) for someone to fake the information 165 in an attempt to get a user to improperly provide sensitive information or make an undesired selection through the user interface (e.g., spoofing). Note that the information 165 is not directly accessible by the content 135, and since the information 165 can be specific to the particular computing device 150, any attempted infiltration of the user interface would likely need to tailor its attack to each individual target computer, thus increasing the difficulty of the attack. In addition, further actions can be taken to provide security for the content when rendered as a user interface.

Figure 2:
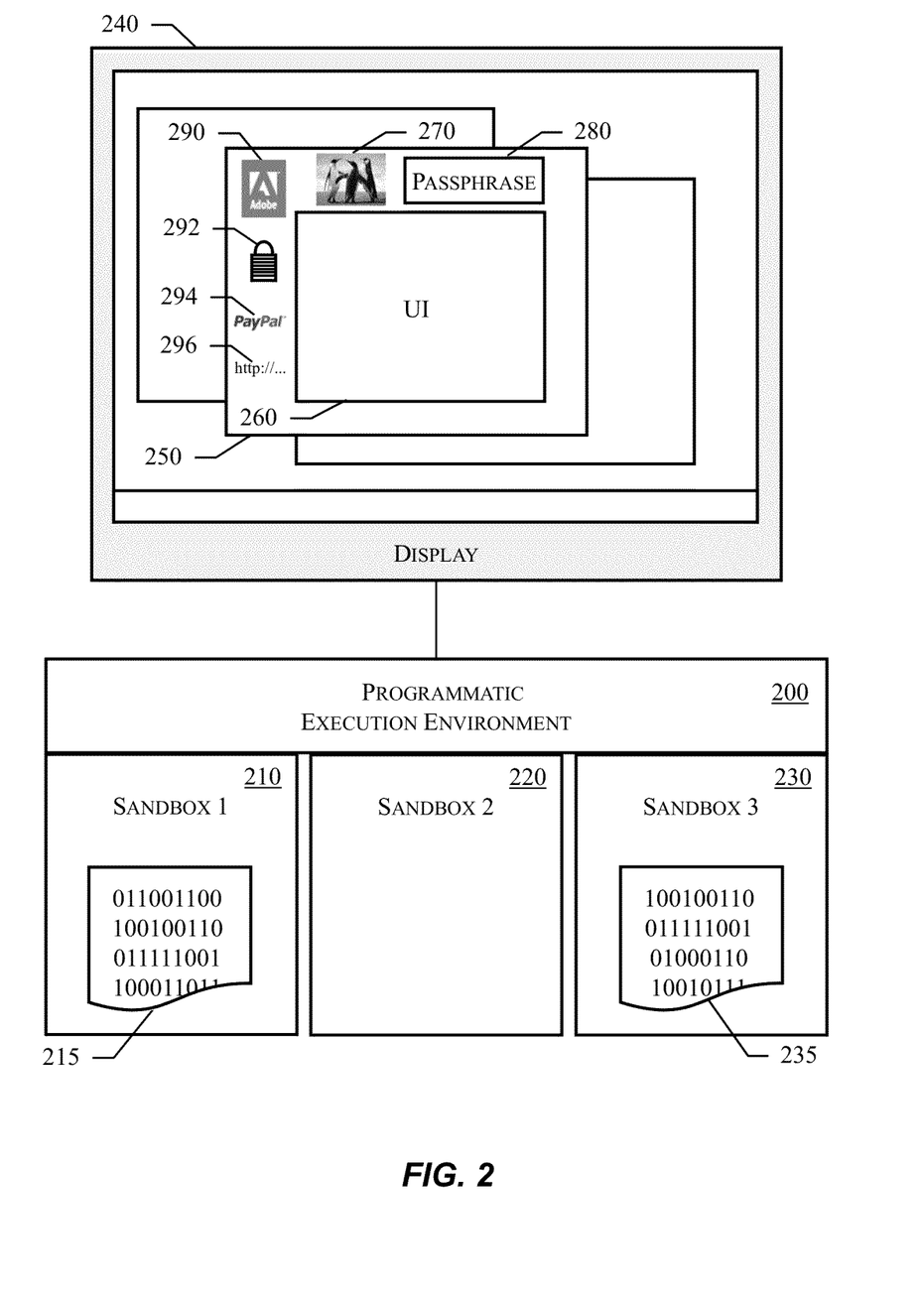
FIG. 2 is a block diagram showing another example of a system in which secure user interface content is presented.

FIG. 2 is a block diagram showing another example of a system in which secure user interface content is presented. A programmatic execution environment 200 can be the same as (or similar to) the programmatic execution environment 185. Further, the environment 200 manages multiple, distinct sandboxes. As used herein, a "sandbox" is an isolation environment, where code that has been loaded using the isolation environment is prevented from accessing, modifying or interfering with code that has been loaded using other isolation environments. For example, an application of one isolation environment may not be permitted to call subroutines of or share data with another application in a different isolation environment. An isolation environment can also govern, with varying degrees of granularity, an application's access to resources (e.g., network, disk or input output devices) available through the environment 200.

In some implementations, the programmatic execution environment 200 manages three distinct sandboxes. A first sandbox 210 is used for secure content (such as discussed above in connection with FIG. 1) and imposes various restrictions, as discussed further below. A second sandbox 220 is used for unsecure code received over the network, where the sandbox 220 allows loaded code to communicate over the network (potentially limited to communications with the network domain from which it came), but also imposes limits on access to the local file system of the computer running the environment 200. The second sandbox 220 can be further divided based on originating domain, such as described in U.S. application Ser. No. 11/677,557. A third sandbox 230 is used for secure code, such as local applications that can be granted full access to the local file system as well as full access to the network.

In some implementations, the first sandbox 210 can be limited for use with only content that comes via a secure path, where it is both digitally signed and downloaded over an encrypted communication link. Moreover, in some implementations, the first sandbox 210 can impose at least two levels of isolation. In a first level of isolation, the environment 200 can use the sandbox 210 to programmatically isolate loaded content from other content and code that might be in the other sandboxes. This can include preventing the loading of additional content by the received content, unless the additional content is determined to be authentic secure content as done for the received content, and this can include providing the loaded content with control over whether or not it exposes an API to any other content/code. Thus, content from some other network domain (e.g., a website different than the source of the loaded content) can be prevented from making calls into the loaded content to request actions that may be malicious (e.g., making an improper charge to your credit card). In addition, the sandbox 210 can prevent outside programs from accessing locally saved objects (LSOs), but allow other code loaded into the sandbox 210 to access LSOs (i.e., LSO sharing among code in the sandbox 210).

Figure 4:
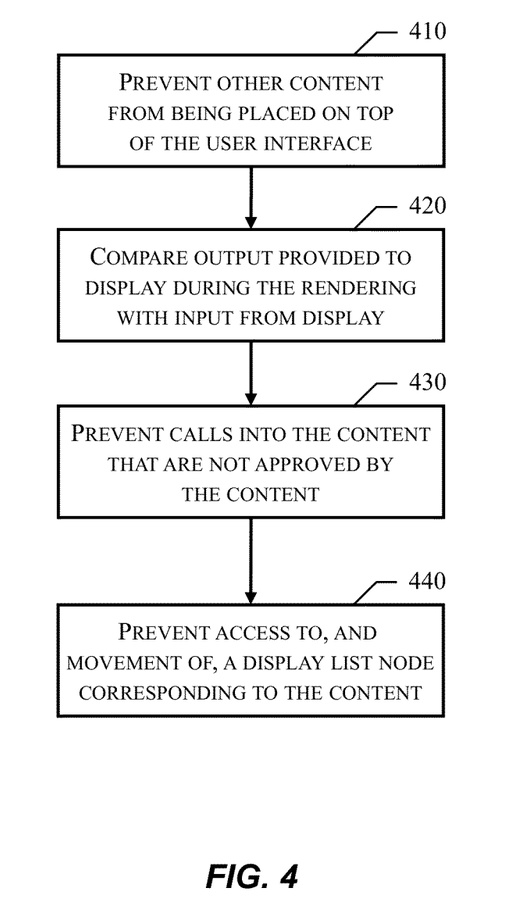
FIG. 4 is a flowchart showing an example of operations that can be performed when processing input received through a secure user interface.

In a second level of isolation, the environment 200 can use the sandbox 210 to protect the path to the screen of a display device 240 that the loaded content uses to effect a user interface 260 (additional details regarding such protection are provided below in connection with FIG. 4). In some implementations, the received content can be bytecode 215 that is loaded using the first sandbox 210. In some implementations, the bytecode 215 can be loaded via a path (e.g., a modified version of a traditional loader API) that recognizes the presence of a digital signature for the bytecode 215 and validates it before allowing the bytecode 215 to run.

The environment 200 can run the bytecode 215 to effect the user interface 260 within an on-screen border 250 that contains the information retrieved locally, visually separates the user interface from any other visual elements on the display, and includes an indication that the user interface is secure. For example, the retrieved information can be an image 270 and a passphrase 280, which were previously selected by a user for purposes of securing user interface content. The indication that the user interface is secure can include a logo 290 for the provider of the program used to check the content and present the user interface, a security icon 292, the name 294 of the publisher of the content (e.g., PAYPAL™), which can be taken from the signing certificate, a link 296 to further information, or a combination of these.

Moreover, the border 250 fully surrounds the user interface 260, as shown in FIG. 2. For example, a black border at 75% opacity can be drawn around the entire user interface 260. This can provide additional security by separating the user interface 260 from any adjacent content (e.g., non-secure HTML rendered to the screen) drawn by other sources (e.g., as an additional anti-spoofing measure). Furthermore, the border 250 (or a visual wrapper, such as shown in FIG. 1) can be rendered to the display using code that is controlled by the environment 200, such as by using additional bytecode 235 loaded into the third sandbox 230, and the environment 200 can provide an API that allows various other types of rendered content to load, display and unload the secure user interface content.

Figure 3:
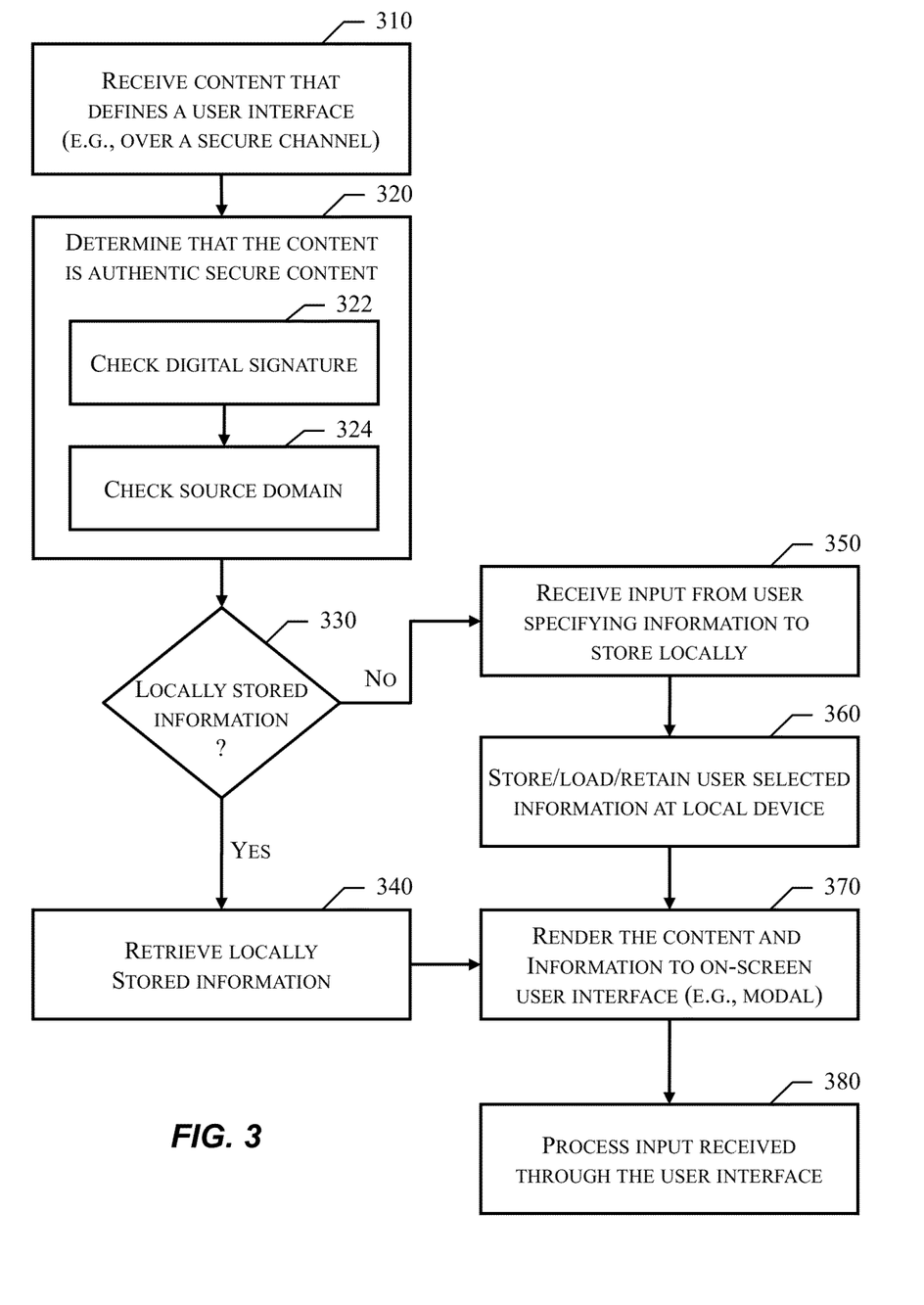
FIG. 3 is a flowchart showing an example of a process of presenting secure user interface content.

FIG. 3 is a flowchart showing an example of a process of presenting secure user interface content. Content is received 310, at a computing device, over a communication network from a separate computing system. For example, a secure channel can be established in the communication network (e.g., an encrypted communications link), and this secure channel can be used when receiving the content. Furthermore, a check can be made to determine 320 whether the received content is authentic secure content. This can involve checking 322 a digital signature associated with the content to confirm a signing source and/or a lack of data corruption, checking 324 a source domain of the content, or both.

With respect to checking a digital signature, the content can be signed by a certificate that establishes its provenance. The certificate used can be embedded in a programmatic execution environment that checks the digital signature. In some implementations, this signing can be controlled by a provider of the management program used to check and present the user interface content. In some cases, such provider can delegate the signing capability to other entities. As will be appreciated, a variety of signing models are possible.

With respect to checking the source domain, this can include confirming that the content was received from a predefined secure domain in the communication network. This can include confirming that the content comes from a single authorized domain (e.g., from a website controlled by a provider of the management program used to check and present the user interface content, e.g., adobe.com) when one domain is used for content from multiple sources (in which case, such sources would route the content through the single authorized domain, either on the fly or by hosting the content at the authorized site). This checking can also include confirming that the content comes from a domain that was previously defined as secure (e.g., by inclusion on a list of safe websites as determined by a provider of the management program used to check and present the user interface content).

A check is made 330 as to whether there is locally stored information that was previously selected by a user for purposes of securing user interface content. If so, the information is retrieved 340 locally at the computing device. If not, a user can be prompted for such information for use with the currently received content and with content received in the future. Thus, input can be received 350 specifying information to store locally at the computing device. This information can include data that is provided by the user (e.g., an image created by the user, a passphrase typed in by the user, or both), data that is already stored on the local computer and which the user selects from a list of options (e.g., a computer name assigned to the local computer, a WiFi network name, a user name at the local computer, etc.), or both. Once this input is received, the user selected information is stored on, loaded from, and/or retained at 360 the local computing device.

In some implementations, the information is first specified by a user upon the first downloading of secure user interface content, as described above. In other cases, the information can be first specified by a user at an earlier time, such as when a programmatic execution environment is installed or updated. Thus, the operations 350, 360 can be disconnected from (or connected through other un-shown process operations with) the flowchart shown in FIG. 3. As another example, these operations can be performed via a control panel provided by a programmatic execution environment.

In any case, once the locally stored information is loaded, the received content is rendered 370 to a display as a user interface with the locally stored information, the visual separation, and/or the security indication, as described above. This can include rendering in a modal window, which prevents interactions with the computing device outside of the modal window until the modal window is closed (e.g., an OS-based modal window). Furthermore, input can then be received through the user interface and processed 380 as appropriate in view of the specific functionality of the user interface, as defined by the received content.

In order to further increase the security of the user interface, additional operations can be performed that effect a special rendering path for the secure user interface content. FIG. 4 is a flowchart showing an example of operations that can be performed when processing input received through a secure user interface. Other content/code (e.g., bytecode) can be prevented 410 from being placed on top of the user interface and the visual wrapper on the display. This can help prevent a form of attack where a different interface is surreptitiously elevated in a display list and can then capture inputs intended for the secure user interface. It should be noted that, in some implementations, this will require blocking the user interface content from having access to certain APIs that could be used to circumvent the nothing-on-top restriction (e.g., such APIs can be made inoperative when accessed from the sandbox used to isolate the user interface content).

In addition, an output provided to the display during the rendering (e.g., an image loaded into a frame buffer of the display device) can be compared 420 with an input retrieved from the display (e.g., a screen shot pulled from the display device using the operating system) to see if they are the same. This can help prevent a form of attack where an image is placed over the secure user interface to confuse the user about where to click in the user interface to effect a particular selection.

Furthermore, calls into the content/code (e.g., bytecode) in a sandbox can be prevented 430 if those calls are not approved by the content/code itself. Finally, access to, and movement of, a node in a display list can be prevented 440, where the node corresponds to the content/code. For example, a programmatic execution environment can manage a display list used when rendering content to the screen, and the programmatic execution environment can control interactions with this display list by various programs to prevent accesses or movements with respect to the node in the list used to render the secure user interface. In addition, the secure user interface can have its participation in the display list limited such that it is subject to translations during rendering, but neither scaling nor rotation are applied.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, in a web browser implementation, an iframe in a web page can be handled as secure user interface content, as described above. In some cases, the actions recited in the claims can be performed in a different order and still achieve desirable results.

What is claimed is:

1. A method comprising:
    receiving input at a computing device, the input specifying information to store locally at the computing device;
    receiving, at the computing device, content over a communication network from a computing system, the computing system being separate from the computing device, the content comprising content bytecode;
    determining that the received content is authentic secure content;
    loading the content into a sandbox managed by a programmatic execution environment running on the computing device;
    retrieving the information stored at the computing device;
    rendering the received content, to a display for the computing device, as a user interface within an on-screen border, wherein the on-screen border (i) contains the retrieved information, and (ii) visually separates the user interface from any other visual elements on the display;
    processing input received through the user interface;
    preventing bytecode other than the content bytecode and additional bytecode used to form the on-screen border from being placed on top of the user interface and the on-screen border on the display;
    comparing an output provided to the display during the rendering with an input retrieved from the display; and
    preventing access to, and movement of, a node in a display list managed by the programmatic execution environment, the node corresponding to the content bytecode.

2. The method of claim 1, wherein retrieving the information comprises retrieving an image and a passphrase previously specified by the input.

3. The method of claim 1, wherein the determining comprises:
    confirming a digital signature associated with the content; and
    confirming the content was received from a predefined secure domain in the communication network.

4. The method of claim 1, wherein the sandbox is distinct from at least two other sandboxes managed by the programmatic execution environment, and wherein the sandbox prevents loading of additional content by the received content, unless the additional content is determined to be authentic secure content.

5. The method of claim 1, wherein the rendering comprises rendering the additional bytecode retained by the programmatic execution environment to form the on-screen border.

6. The method of claim 1, wherein the receiving comprises receiving the content over a secure channel established in the communication network, the rendering comprises rendering in a modal window thereby preventing interactions with the computing device outside of the modal window until the modal window is closed, and the method further comprising:
    preventing calls into the content bytecode in the sandbox that are not approved by the content bytecode.

7. A computer storage medium encoded with a computer program, the computer program comprising instructions that when executed by data processing apparatus cause the data processing apparatus to perform operations comprising:
    receiving, at the data processing apparatus, content over a communication network from a computing system, the computing system being separate from the data processing apparatus, the content comprising content bytecode;
    determining that the received content is authentic secure content;
    loading the content into a sandbox managed by a programmatic execution environment running on the data processing apparatus;
    retrieving information stored at the data processing apparatus and previously selected by a user;
    rendering the received content, to a display of the data processing apparatus, as a user interface with a visual wrapper, wherein the visual wrapper (i) includes the retrieved information, and (ii) visually separates the user interface from other visual elements on the display;
    processing input received through the user interface;
    preventing bytecode other than the content bytecode and additional bytecode used to form the visual wrapper from being placed on top of the user interface and the visual wrapper on the display;
    comparing an output provided to the display during the rendering with an input retrieved from the display; and
    preventing access to, and movement of, a node in a display list managed by the programmatic execution environment, the node corresponding to the content bytecode.

8. The computer storage medium of claim 7, wherein retrieving the information comprises retrieving an image and a passphrase.

9. The computer storage medium of claim 7, wherein the determining comprises:
    confirming a digital signature associated with the content; and
    confirming the content was received from a predefined secure domain in the communication network.

10. The computer storage medium of claim 7, wherein the sandbox is distinct from at least two other sandboxes managed by the programmatic execution environment, and wherein the sandbox prevents loading of additional content by the received content, unless the additional content is determined to be authentic secure content.

11. The computer storage medium of claim 7, wherein the rendering comprises rendering the additional bytecode retained by the programmatic execution environment to form the visual wrapper.

12. The computer storage medium of claim 7, wherein the receiving comprises receiving the content over a secure channel established in the communication network, the rendering comprises rendering in a modal window thereby preventing interactions with the data processing apparatus outside of the modal window until the modal window is closed, and the operations further comprising:

preventing calls into the content bytecode in the sandbox that are not approved by the content bytecode.

13. The computer storage medium of claim 7, wherein the visual wrapper comprises a border.

14. A system comprising:

a display device; and a computing device coupled with the display device and programmed to perform operations comprising:

receiving, at the computing device, content over a communication network from a computing system, the computing system being separate from the computing device, the content comprising content bytecode;

determining that the received content is authentic secure content;

loading the content into a sandbox managed by a programmatic execution environment of the computing device;

retrieving information stored at the computing device and previously selected by a user for purposes of securing user interface content;

rendering the received content, to the display device, as a user interface with a visual wrapper, wherein the visual wrapper includes the retrieved information and visually separates the user interface from other visual elements on the display;

processing input received through the user interface;

preventing bytecode other than the content bytecode and additional bytecode used to form the visual wrapper from being placed on top of the user interface and the visual wrapper on the display device;

comparing an output provided to the display device during the rendering with an input retrieved from the display device; and preventing access to, and movement of, a node in a display list managed by the programmatic execution environment, the node corresponding to the content bytecode.

15. The system of claim 14, wherein retrieving the information comprises retrieving an image and a passphrase.

16. The system of claim 14, wherein the determining comprises:

confirming a digital signature associated with the content; and confirming the content was received from a predefined secure domain in the communication network.

17. The system of claim 14, wherein the sandbox is distinct from at least two other sandboxes managed by the programmatic execution environment, and wherein the sandbox prevents loading of additional content by the received content, unless the additional content is determined to be authentic secure content.

18. The system of claim 14, wherein the rendering comprises rendering the additional bytecode retained by the programmatic execution environment to form the visual wrapper.

19. The system of claim 14, wherein the receiving comprises receiving the content over a secure channel established in the communication network, the rendering comprises rendering in a modal window thereby preventing interactions with the computing device outside of the modal window until the modal window is closed, and the operations further comprising:

preventing calls into the content bytecode in the sandbox that are not approved by the content bytecode.

20. The system of claim 14, wherein the display device and the computing device are integrated into a single consumer electronic device.

* * * * *